United States Patent [19]

Ito et al.

[11] 3,944,351
[45] Mar. 16, 1976

[54] APPARATUS FOR SUPERIMPOSING A PLURALITY OF IMAGES

[75] Inventors: Yuji Ito, Tokyo; Nori Kato, Kawasaki, both of Japan

[73] Assignee: Canon Kabushiki Kaisha, Tokyo, Japan

[22] Filed: Feb. 26, 1974

[21] Appl. No.: 445,883

[30] Foreign Application Priority Data
Mar. 2, 1973  Japan................................ 48-24355

[52] U.S. Cl. ...................... 353/31; 353/37; 353/94
[51] Int. Cl.² .......................................... G03B 21/10
[58] Field of Search .............................. 353/30–31, 353/84, 37, 94, 7

[56] References Cited
UNITED STATES PATENTS

| | | | |
|---|---|---|---|
| 2,598,573 | 5/1952 | Lutes ................................ | 353/30 X |
| 3,036,496 | 5/1962 | Frederick et al. .................... | 353/30 |
| 3,280,698 | 10/1966 | Councilman et al................. | 353/30 |

FOREIGN PATENTS OR APPLICATIONS
2,035,431   7/1970   Germany

*Primary Examiner*—Richard E. Aegerter
*Assistant Examiner*—Michael H. Thaler
*Attorney, Agent, or Firm*—Toren, McGeady and Stanger

[57] ABSTRACT

An apparatus for producing a multiplicity of projection light images in which the ideal planes of said images are adapted to be parallel to the screen by permitting a projection lens, a photographic transparency and a light source filament constituting part of one of a plurality of projection systems to be oriented with respect to a reference axis perpendicularly intersecting the screen in such a manner that the optical axis of the projection lens is parallel thereto, and the transparency and filament are perpendicular thereto. In this manner uniform distribution of illuminance of projection light on the screen is effected throughout the entire screen area.

1 Claim, 6 Drawing Figures

APPARATUS FOR SUPERIMPOSING A PLURALITY OF IMAGES

This invention relates to an apparatus for producing a photographic image with the desired gamut of colors by superimposing a plurality of image-bearing of colored projection light on a screen.

The arrangement of a plurality of projectors is known which constitute a projection system for producing a color photographic image of an object by superimposing images projected on a screen by the projectors through colored filters in the three primaries from positives made from negatives which have been taken from the same object in different wavelength regions for the purposes of detecting pollution and researching ground resources. With such an arrangement, it is highly desirable that the ideal image plane for each projector is parallel to the screen.

Accordingly it is an object of the present invention to provide an apparatus for producing a photographic image with the desired gamut of colors by superimposing a plurality of image-bearing beams of colored projection light on a screen in which each of the ideal image planes is adapted to be parallel to the screen. Other objects, features and advantages of the invention will be apparent to those skilled in the art by reference to the following description taken in connection with the accompanying drawings wherein.

Figure 1:
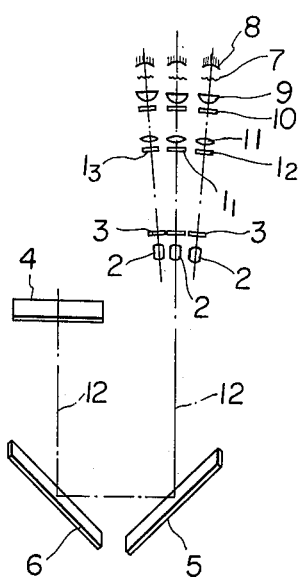
FIG. 1 is, in part, a front section view and, in part, a schematic view of an embodiment of the apparatus according to the present invention.
Figure 2:
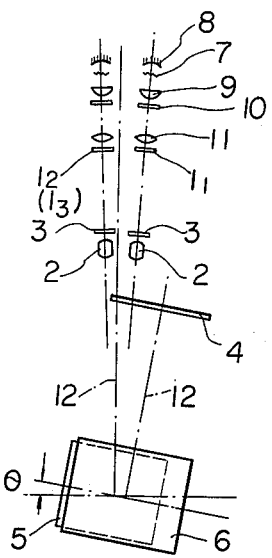
FIG. 2 is a side view of part of the elements appearing in FIG. 1.
Figure 3:
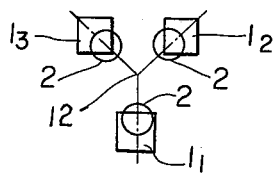
FIG. 3 is a diagram illustrating a side-by-side, spatial location of the three projection lenses and photographic transparencies as viewed from a point on the screen of the apparatus in FIG. 1.
Figure 4:
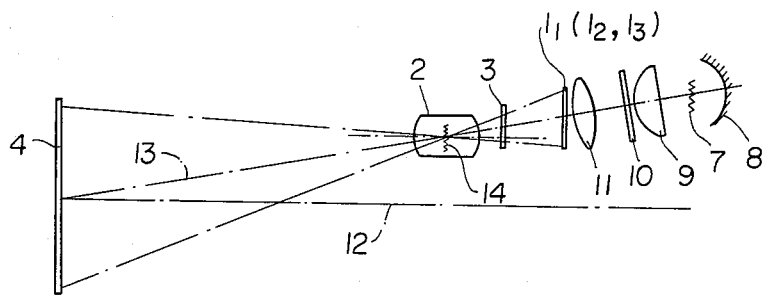
FIG. 4 is a diagram illustrating in detail the arrangement of the elements constituting one of the projection assemblies shown in FIG. 1.
Figure 6:
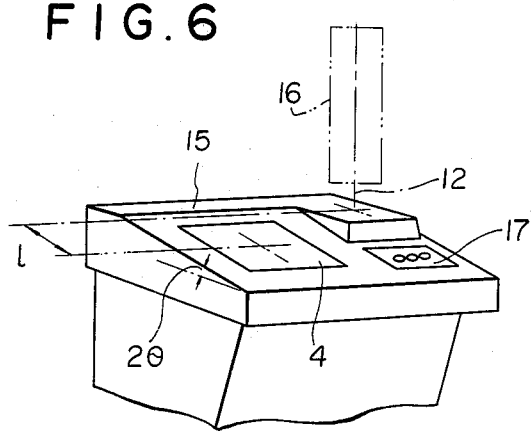
FIG. 6 is a perspective view of the apparatus according to the invention.

As illustrated in the drawings, an apparatus constructed in accordance with the present invention, for producing a photographic image with the gamut of colors, or with a selected range of colors by superimposing three channel images, comprises three transparency holders 1 for receiving three transparencies $1_1$, $1_2$ and $1_3$ taken from one and the same object in three different wavelength regions, three projection lenses 2 for projecting the channel images, three colored filters 3 selected for their ability to pass only one of the regions of the visible spectrum and adapted for the channel images, a screen 4, two plane mirrors 5 and 6 disposed perpendicular to each other and arranged in the paths of the projection light from the projection lenses so as to direct the projection light to the screen as shown in FIG. 1, and three transparency illuminating systems each including a filment 7 of a light source lamp, a curve surface reflectors 8 of which the center of curvature coincides with the filament 7, a condenser lens 9, a heat-shield filter 10 and a field lens 11. As shown in FIG. 3, the three projection assemblies composed of a projection lens 2, a colored filter, a transparency and an illuminating system are disposed side-by-side around a reference axis 12 perpendicular to the screen and passing through the center of the screen area, and are spaced in such a manner that each of the assemblies is at a short equi-distance from the reference axis 12, and the two adjacent ones are at an angle of 120° from each other. As shown in FIG. 4, the arrangement and orientation of the elements in each assembly are such that (1) the optical axis of the projection lens 2 is parallel to the reference axis 12; (2) the transparency located between the filter 3 behind the projection lens and the illuminating system is perpendicular to the reference axis 12; (3) the center of the complete projection lens 2 and the center of the transparency holder area define a line 13 passing through the point at which the reference axis 12 intersects the screen 4; (4) the optical axis of the illuminating system coincides with the above-defined line 13; and (5) the direction of the filament 7 is perpendicular to the reference axis 12. For convenience of viewing the superimposed images on the screen, it is preferred to incline the plane mirror assembly 5 and 6 toward the rear at an angle, $\theta$, with respect to the horizontal plane, so that the screen may be mounted on the top of the desk of the apparatus case as rearwardly inclined at an angle of $2\theta$ as shown in FIG. 6.

With the apparatus of the construction described above, the images of the transparencies illuminated by the illuminating systems are projected through the filters 3 by the projection lenses 2 onto the screen 4 after has been reflected from the plane mirrors 5 and 6, so that image-bearing beams of colored projection light are superimposed on the screen to produce a color photographic image, whether the produced image on the screen is in the gamut of colors, or in a selected range of colors being dependent upon the combination of the selected colored filters. When the superimposed images are offset from one another due to the translational and angular deviations, magnified image size differences and imperfect focussing, according to the invention, firstly the correction of the longitudinal and laternal axis offsets and angular offsets of the superimposed images, i.e., the so-called sequential registration of the images is performed; secondly the projection lens and transparency in the same assembly are moved in a predetermined fixedly spaced relationship to each other together with the illuminating system along the line 13 to make the size of the magnified image become equal to that of the other images; and finally the focussing is made by moving the projection lens along its optical axis.

In order to effect the uniform distribution of illuminance of each projection light on the screen throughout the entire screen area, according to the invention, while the center line of the projection assembly, i.e., the above-defined line 13, is inclined at some degrees from the reference axis 12 perpendicular to the screen, the projection lens 2, the transparency and the filament are permitted to be oriented with respect to the reference axis in such a manner that the optical axis of the projection lens is parallel thereto, and the transparency and filament are perpendicular thereto, with the result that an image 14 of the filament produced at the exit pupil of the projection lens 2 by the lenses 9 and 10 is parallel to the optical axis of the projection lens, thereby the image 14, transparency 1 and screen 4 are positioned in parallel to one another on the same axis line 13 to provide an extremely improved uniform illumination distribution on the screen over the prior art. Moreover, the coincidence of the optical axis of the illuminating system with the line 13 facilitates the aberration correction of the illuminating system, thereby giving an added advantage of producing projection light with the more uniform intensity over the entire transparency frame.

It has been the prior art as, for example, in the image size adjustment to move the projection lens and the transparency as a unit along the optical axis of the projection lens. The prior art method for image size adjustment in this manner causes the center portion of the superimposed images to be out of registration, so that additional sequential registration in the longitudinal and lateral directions must be performed. Such a disadvantage is not encountered in the present invention, because the assembly of the projection system is moved along the line 13 not along the optical axis of the projection lens to effect image size adjustment, and the focussing is made by imparting axial movement to only the projection lens.

Figure 5:
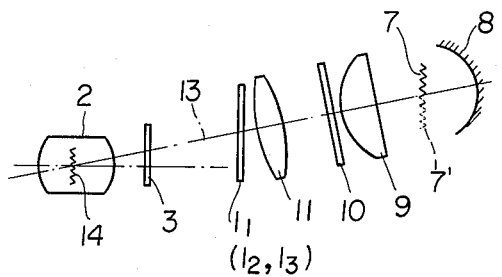
FIG. 5 is a diagram illustrating the arrangement shown in FIG. 4 with a modification.

Referring now to FIG. 5, the upper or lower portion of the filament 7 in the illuminating system shown in FIG. 4 may be cut off at the point at which it intersets the line 13. In this case, that portion of the light energy emitted by the heated filament which emanates rearwardly to the curved surface mirror 8 is focussed at the position of the cut off filament 7', so that the light energy of the heated filament is efficiently used for projection, or otherwise, the rearwardly emitted portion of the light energy is prohibited by the filament itself from forwardly emanating.

In FIG. 6, a perspective view of the apparatus of the present invention appears. Numeral reference 16 indicates a space in which the three projection assemblies with the downwardly disposed attitude may be mounted on the right hand upper corner on the desk of the apparatus housing. On the left side of the projection assemblies, the screen 4 may be mounted as rearwardly inclined from the horizontal plane to permit comfortable continuous viewing of the screen by an observer while carrying out the necessary operations such as sequential registration, size adjustment and focussing of each of the superimposed images. Further the screen may be mounted as rearwardly displaced at a distance, $l$, from the position of the projection assemblies 16 to provide on the right hand lower corner an idle space 17 in which a panel having control units such as control switches of the illuminating systems may be mounted. 15 is a member with a horizontal surface and a slanted surface.

Although only a preferred embodiment of the present invention is shown and described in detail, other embodiments are possible and changes may be made in the arrangement, construction and form of the elements of the apparatus without departing from the spirit of the invention.

What is claimed is:

1. An apparatus for projecting a plurality of pictures on a single screen by a plurality of projection lenses, comprising:

a horizontal surface and a slanted surface with respect to said horizontal surface and a screen being disposed in said slanted surface;

a first standard axis perpendicularly passing through the center of said screen;

a second standard axis perpendicularly passing through said horizontal surface;

a plurality of projection lenses each having an optical axis parallel with said second standard axis, and being so positioned as to surround the second standard axis portion above the said horizontal surface;

a plurality of mirror members being provided below said planar members for aligning the first standard axis with the second standard axis so that a light ray incident to said mirror members along said first standard axis would be so deflected as to emerge coincident with the second standard axis;

a plurality of pictures, each of which is perpendicular to an optical axis of one of said projection lenses, thus being parallel with the screen; and a plurality of illumination optical systems to illuminate each of said pictures, each said illumination system having lens means to form an image of a filament at a pupil position of a corresponding projection lens, the optical axis of each said lens means being slanted with respect to the optical axis of a corresponding projection lens and passing through the center of the projection lens and the center of the screen.

* * * * *